United States Patent [19]

LaRussa

[11] Patent Number: 5,257,094
[45] Date of Patent: Oct. 26, 1993

[54] HELMET MOUNTED DISPLAY SYSTEM

[76] Inventor: Joseph LaRussa, 451 Rutledge Dr., Yorktown Heights, N.Y. 10598

[21] Appl. No.: 738,213

[22] Filed: Jul. 30, 1991

[51] Int. Cl.$^5$ .................. G02B 27/10; G02B 5/32
[52] U.S. Cl. ........................ 359/13; 359/14; 359/22; 359/24
[58] Field of Search .............. 359/13, 14, 15, 16, 359/22, 24, 25, 23, 630, 631, 632, 19

[56] References Cited

U.S. PATENT DOCUMENTS

| | | | |
|---|---|---|---|
| 4,372,639 | 2/1983 | Johnson | 359/13 X |
| 4,530,564 | 7/1985 | Close | 359/15 X |
| 4,600,271 | 7/1986 | Boyer et al. | 359/13 X |
| 4,655,540 | 4/1987 | Wood et al. | 359/630 X |
| 4,786,125 | 11/1988 | Magarinos | 359/15 X |
| 4,807,978 | 2/1989 | Grinberg et al. | 359/24 X |
| 4,848,894 | 7/1989 | Buser et al. | 359/19 X |
| 4,874,214 | 10/1989 | Cheysson et al. | 359/15 |
| 4,930,847 | 6/1990 | Cederquist | 359/15 |
| 4,961,626 | 10/1990 | Fournier, Jr. et al. | 359/630 |
| 5,011,244 | 4/1991 | Smith et al. | 359/24 X |
| 5,103,323 | 4/1992 | Magarinos et al. | 359/24 X |
| 5,112,121 | 5/1992 | Chang et al. | 359/24 X |
| 5,124,821 | 6/1992 | Antier et al. | 359/19 X |

FOREIGN PATENT DOCUMENTS

| 419199 | 3/1991 | European Pat. Off. | 359/13 |
| 63-305381 | 12/1988 | Japan | 359/22 |

OTHER PUBLICATIONS

Magarinos et al., "Holographic Mirrors", Optical Engineering, vol. 24, No. 5, 1985, pp. 769–780.

Primary Examiner—Constantine Hannaher
Assistant Examiner—Edward J. Glick
Attorney, Agent, or Firm—Handal & Morofsky

[57] ABSTRACT

A holographic display system is disclosed. Utilization of holographic elements provides good transmissivity with respect to both outside stimulus and the superimposed display information. Full color display is enabled by a composite spherical lens and the efficient optical coupling of the display information and the pupil allows the weight of the helmet with the display system to be kept to a minimum.

12 Claims, 13 Drawing Sheets

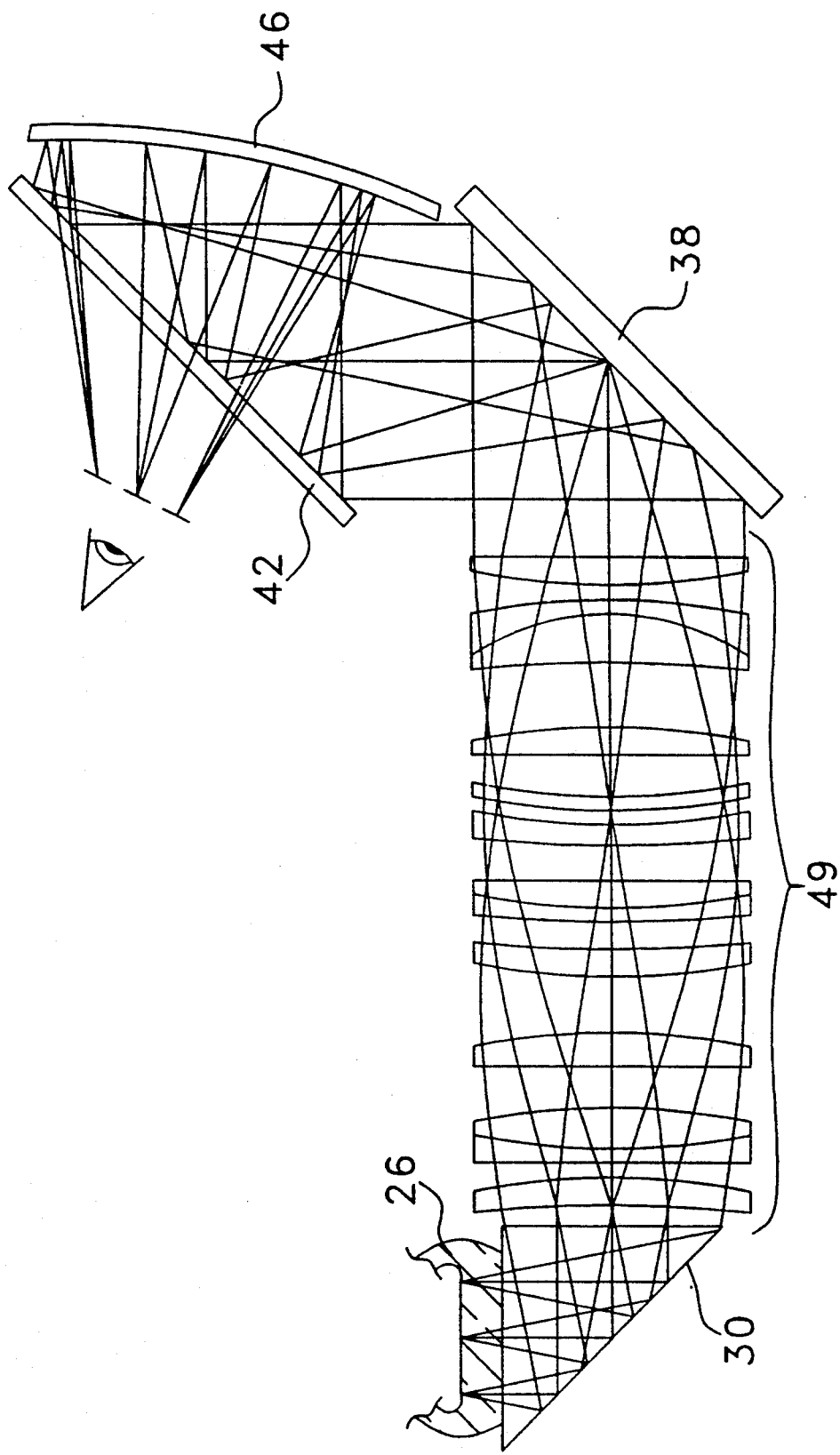

HELMET MOUNTED DISPLAY SYSTEM

TECHNICAL FIELD

The present invention relates to a helmet-mounted display and sighting system for a vehicle which allows the pilot or driver to view a display of information generated by the vehicle's instruments as well as information with respect to the movement of the vehicle, the pilot's line-of-sight, the orientation of the vehicle's guns, a sighting reticle and through computer processing a projected display of weapon impact points, enhanced or computer-processed data base images of the terrain over which the vehicle is passing and/or the like without preventing the pilot or driver from continuing to look out the windscreen of the vehicle. When used as an aiming sight, the device can display a computer generated impact point reticle together with a line-of-sight reticle.

BACKGROUND

The piloting of a vehicle, such as an aircraft (and to a limited extent other advanced vehicles, such as tanks), is recognized as an extremely complex task because of the fact that an aircraft is free to move while exercising six degrees of freedom. In the case of an aircraft, a pilot must reconstruct all six of these variables into a single trajectory and relate them to the three-dimensional worlds seen outside the windscreen. Some idea of the complexity of this task may be achieved by comparing it to the driving of an automobile, which is free to move with only two orthogonal degrees of freedom, thus resulting in only one angular degree of freedom which is, in any case, tied to the orthogonal movement, as long as no skidding is experienced.

Display of vehicle instrument data in a head-up mode against the view through the windscreen may be achieved by either use of a helmet-mounted display or a so-called head-up display. In the case of the head-up display, this may be done by placing a dichroic reflector in front of the windscreen and mounting a cathode ray tube with appropriate optical elements in the instrument panel of the vehicle to generate an image which may be reflected by the dichroic reflector to be viewed by the pilot. The dichroic reflector reflects only the wavelength of the CRT while also stopping only that wavelength from being transmitted to the pilot in his view of the outside world.

Thus, because of the properties of the dichroic reflector, the pilot may simultaneously see through the dichroic reflector and thus have an unobstructed view through the windscreen. This system allows the addition of other functions, for example enhanced images can also be sent to the cathode ray tube, thus allowing the pilot to "see" during poor visibility conditions. Likewise, data with respect to the orientation of guns and the flight path of an aircraft could also be displayed by the system. Moreover, by appropriate selection of optical elements between the cathode ray tube and the dichroic reflector, the images reflected by the dichroic reflector can be projected to optical infinity. Thus, the pilot can focus his eyes on the instrumentation and other information while still focusing on the scene outside his windscreen which is effectively at infinity.

In spite of the many obvious advantages of this system, it also has a number of problems which preclude its widespread employment in, for example, the aviation industry. Firstly, few existing aircraft have sufficient space available on an already crowded instrument panel to allow for the retro-fitting of this system. Secondly, even in the case of employment in newly designed aircraft, the demands for instrument panel space are such that the space is difficult or sometimes impossible to provide. Finally, there is also some objection to placing a dichroic reflector in front of the windscreen of an aircraft.

In an attempt to provide a display system which does not have the disadvantages of the instrument pane dichroic reflector system described above, systems in which a television cathode ray tube is mounted on an aircraft pilot's helmet for viewing by the pilot have been proposed. A display of the pilot's line-of-sight may also be synthesized in such systems, in order that the aircraft guns may be directed to fire along the pilot's line-of-sight onto a desired target. The pilot's helmet is necessarily provided with a device which detects the orientation of the pilot's helmet and, thus, his line-of-sight. This allows the slaving of guns or other systems on board the aircraft to movements of the pilot's head.

SUMMARY OF THE INVENTION

The invention, as claimed, is intended to provide a full color helmet mounted display system. While, for the sake of clarity, it is described in terms of an aircraft, it is contemplated that the inventive apparatus will find application in other vehicles (such as tanks), vehicle simulators and other non-vehicular applications. As used herein, the term "pilot" refers to the operator of a vehicle, simulator or other device whether an aircraft, tank, ship or the like. The invention solves the problem of providing a display for a vehicle which does not take up any space on the instrument panel, may be retrofitted to existing aircraft and does not involve the placement of excessive weight on the pilot's helmet. At the same time, the invention is relatively inexpensive to manufacture and requires no costly alignment procedure.

The above advantages are achieved by generating a video analog of the information which one wishes to provide to the head-up display in a non-crucial portion of the aircraft and optically air-coupling this information to the eye of the pilot. At the same time, a slaving mechanism may be controlled and the pilot's line-of-sight read by generating a reference signal, which carries the pilot's line-of-sight, and optically coupling that signal to a detector which provides that information to the video analog generating system and an on-board computer which controls various systems on the aircraft.

A specific application for the holographic elements of the type to be described is a wide field of vision, trichromatic helmet mounted display (WFOV trichromatic HMD).

BRIEF DESCRIPTION OF THE DRAWINGS

One way of carrying out the invention is described in detail below with reference to drawings which illustrate only one specific embodiment and some minor variations of the invention and in which:

FIG. 4(a) and 4(b) are ray traces of the optics of a portion of the present invention;

DETAILED DESCRIPTION OF THE DRAWINGS

Figure 1:
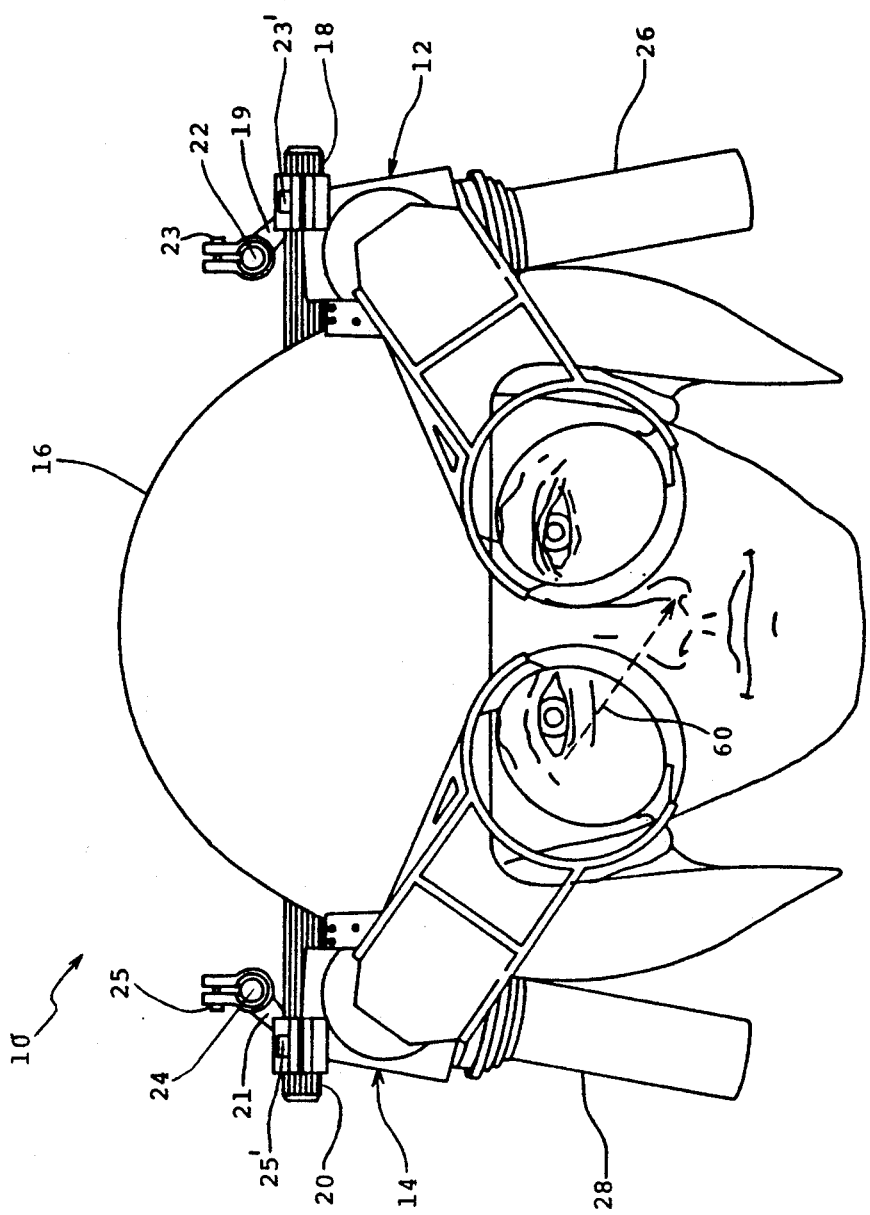
FIG. 1 is a front view of a helmet with the inventive display system being worn by a pilot.
Figure 2:
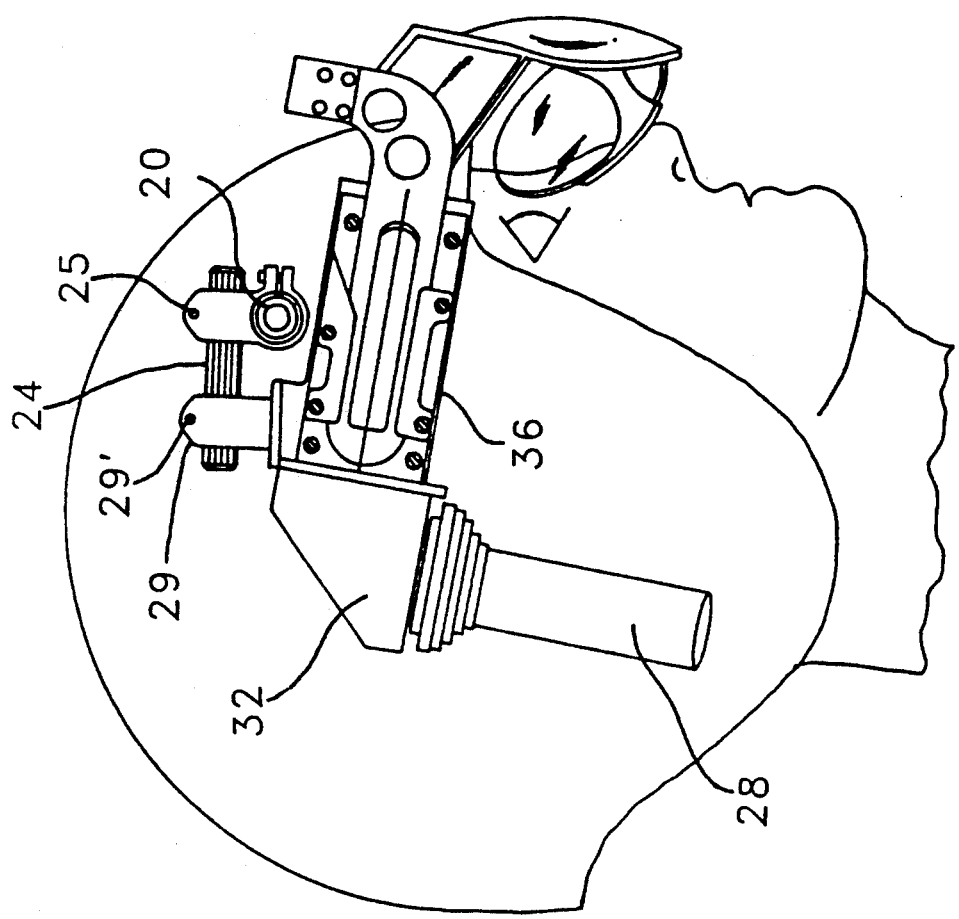
FIG. 2 is a side view of a helmet with the inventive display system being worn by a pilot.
Figure 3:
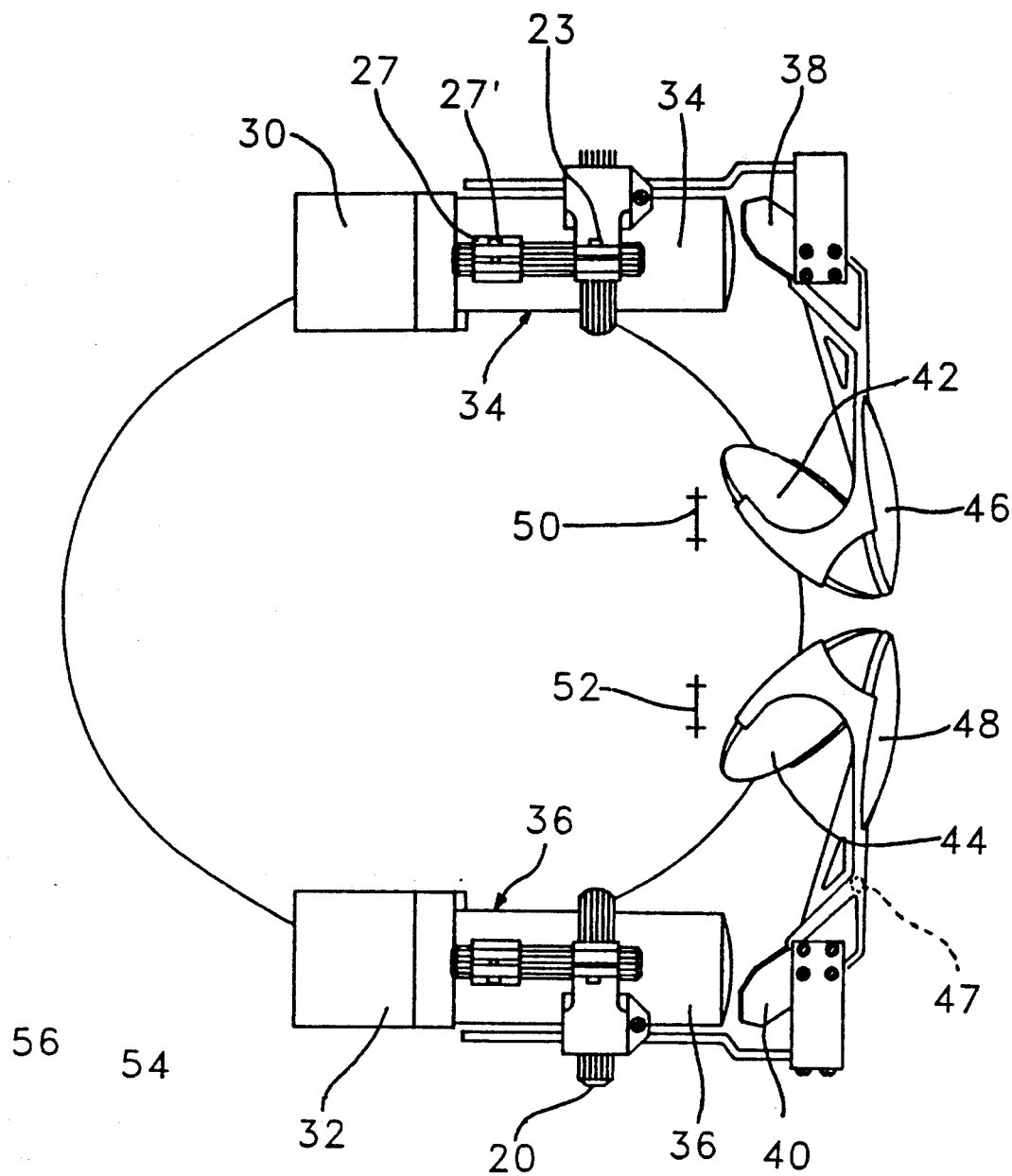
FIG. 3 is a top view of a helmet with the inventive display system being worn by a pilot.

FIGS. 1-3 show one embodiment of a WFOV trichromatic HMD 10. Left and right monacle assemblies, 12 and 14, respectively, are mounted on the helmet 16. Splined rod 18 extends from and is secured to helmet 16 and supports monacle assembly 12 via double jaw 19. One of the jaws of double jaw 19 is secured to and may be screw tightened around rod 18. In similar fashion, a second splined rod 20 extends from and is secured to helmet 16 and supports monacle assembly 14 via a second double jaw 21. One of the jaws of double jaw 21 is secured to and may be screw tightened around rod 20. Additional splined rod 22 is secured in the other jaw of double jaw 19 and may be tightened in position by a screw 23 in a manner similar to the tightening of its other jaw to rod 18 along screw 23'. Likewise, a splined rod 24 is secured to splined rod 20 and monacle assembly 14. Screw 25 secures one of the jaws of double jaw 21 to rod 24. The other jaw is secured to rod 20 by screw 25'.

The splined rods allow the monacle assemblies to be adjusted in position and rigidly held in place when the proper adjustment has been achieved. More particularly, cathode ray tube (CRT) 26 is held in position by being secured to monacle assembly 12. Monacle assembly 12 is secured to a single jaw 27. Jaw 27 is tightened around rod 22 by screw 27'. Rod 22 is secured in one of the jaws of double jaw 19 by screw 23. The other jaw of double jaw 19 is secured by screw 23', around rod 18, thus making fast the left assembly. Cathode ray tube 28 is held in position by being secured to monacle assembly 14. Monacle assembly 14 is secured to a single jaw 29. Jaw 29 is tightened around rod 24 by a screw 29'. Rod 24 is secured in one of the jaws of double jaw 21 by screw 25. The other jaw of double jaw 21 is secured by screw 25' around rod 20, thus making fast the right assembly.

Figure 4A:
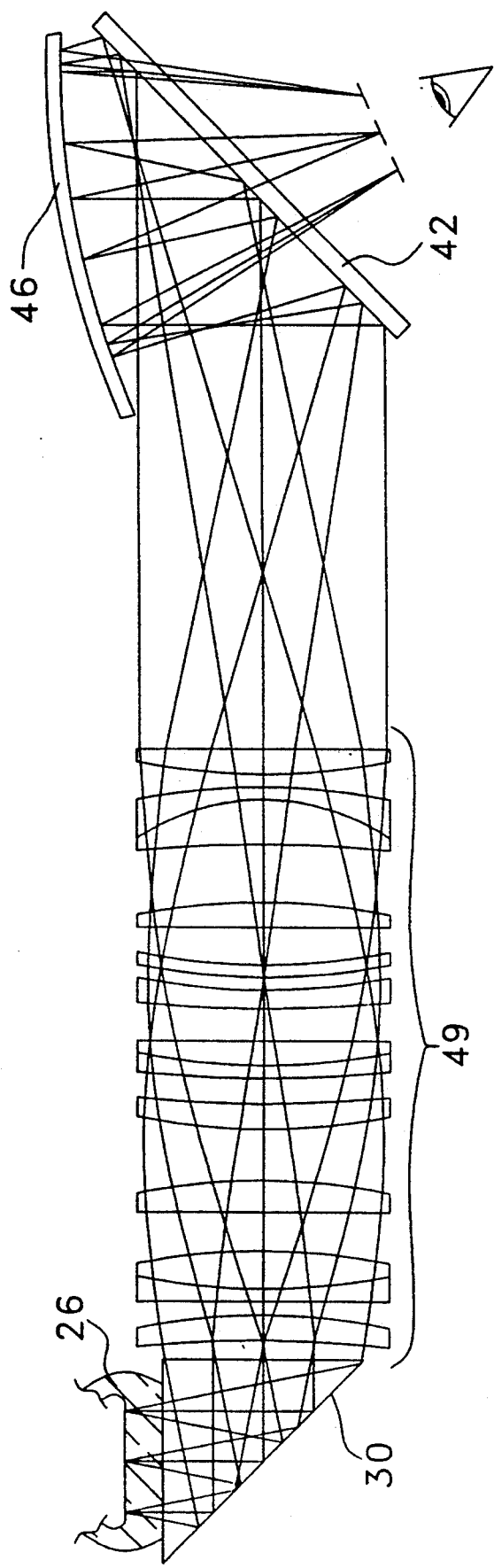

Cathode ray tubes 26 and 28 each generate a three-color image to be displayed by their respective monacle assemblies. Referring to FIGS. 4(a) and 4(b), the images pass through totally internally reflecting prisms 30 and 32, respectively, which act as mirrors and relay lens packages 34 and 36, respectively. Mirrors 38 and 40 (which may be holographic) reflect the trichromatic light emanating from relay lens packages 34 and 36, respectively, to holographic beamsplitters 42 and 44, respectively. The folding of the path provided by mirror 38 is not shown in FIG. 4(a) for purposes of simplicity. The holographic beamsplitters are active only for the three discrete colors generated by the cathode ray tubes. The holographic beamsplitters 42 and 44 are active for three active bandwidths which are on the order of 20 nanometers wide and centered on the wavelengths of the three discreet colors generated by the cathode ray tubes. At other wavelengths, they are transparent.

Notch beamsplitters 42 and 44 reflect one-half of only the trichromatic light to spherical holographic notch reflectors 46 and 48, respectively with the balance of the light 60 passing downwardly to avoid interfering with the view through the other eye (FIG. 1). Notch beamsplitters 42 and 44 are transparent to wavelengths other than the three wavelengths emitted by their respective CRT. Notch beamsplitters 42 and 44 each made up of three layers, each active for one wavelength. Each layer is active over approximately 20 nanometers for each of the, for example, red, green and blue wavelengths emitted by the cathode ray tubes. Concave holographic reflectors are used for the spherical reflectors 46 and 48 and, in contrast to reflectors 42 and 44, reflect substantially all of the light at wavelengths emitted by the cathode ray tubes and allow substantially all other wavelengths to pass substantially unattenuated.

Generally, three wavelengths of light from the image on CRT 26 enter prism 30 through the input face, are totally internally reflected at the reflective face and then pass out prism 30 at the output face. A lens package 49 contained in monacle assembly 12, focuses light and sends it toward mirror 38 (FIG. 4(b)), where it is reflected to beamsplitter 42. From beamsplitter 42 the trichromatic light is directed to notch reflector 46, which directs the trichromatic light back through beamsplitter 42 and focuses the trichromatic light to viewer pupil 50. In similar fashion, another lens package in assembly 14 directs light to the other elements in the optical train to send the trichromatic light to a pupil 52 where the pilot's eye is positioned. If desired, a hinge 47 may be provided to rotate the optics from in front of the eye as shown in phantom lines in FIG. 3.

FIG. 3 illustrates that axis 54 of splined rod 20 and axis 56 of relay lens package 36 are not necessarily coplanar. In the embodiment shown in FIG. 3, the two axes form an angle of approximately 2 degrees when viewed in a top plan projection. Orientation of the optical elements 40, 44 and 48 can accommodate the positioning of the transmission direction of relay lens package 36 with respect to pupil 52.

FIGS. 4(a) and 4(b) illustrate how a color corrected relay lens package directs trichromatic light from a CRT screen via a prism. The embodiment shown in FIG. 4(a) does not include the holographic mirror that would be positioned between the relay lens package and the beamsplitter of FIGS. 1 to 3. Naturally, the relay lens package will vary based upon the optical elements used before and after the relay lens package.

Figure 5:
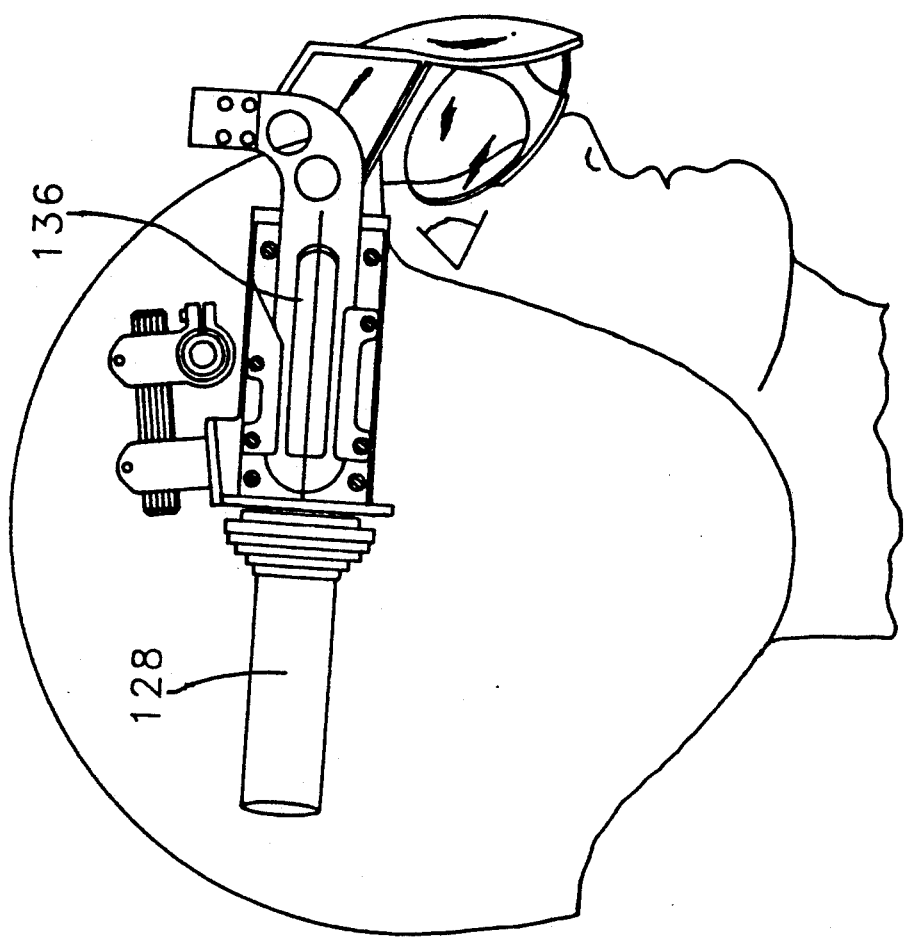
FIG. 5 is a side view of a helmet and display system with a horizontal CRT orientation.
Figure 6:
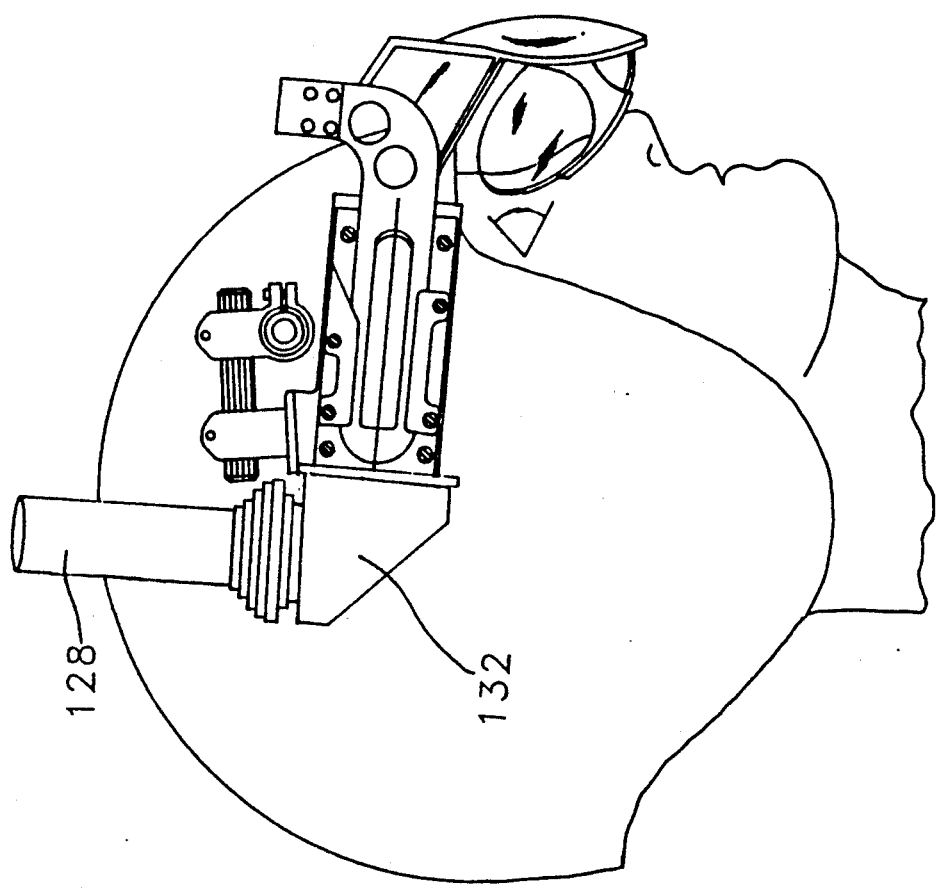
FIG. 6 is a side view of a helmet and display system designed for an upper vertical CRT orientation.

FIGS. 5 and 6 show alternate embodiments of the inventive wide field of view trichromatic HMD. In FIG. 5 CRT 128 is positioned in line with the relay lens package 136. In FIG. 6, prism 132 is oriented such that a CRT may be mounted above the relay lens package in a manner opposite to that shown in FIGS. 1 to 3.

The lens relay packages will obviously differ between the embodiments based upon the presence or absence of a prism or mirror or neither between the CRT and the relay lens package. Differing placement of the CRTs and use of prisms may be used to accommodate different objectives in the weight of the helmet and the center of gravity of the helmet.

Figure 7:
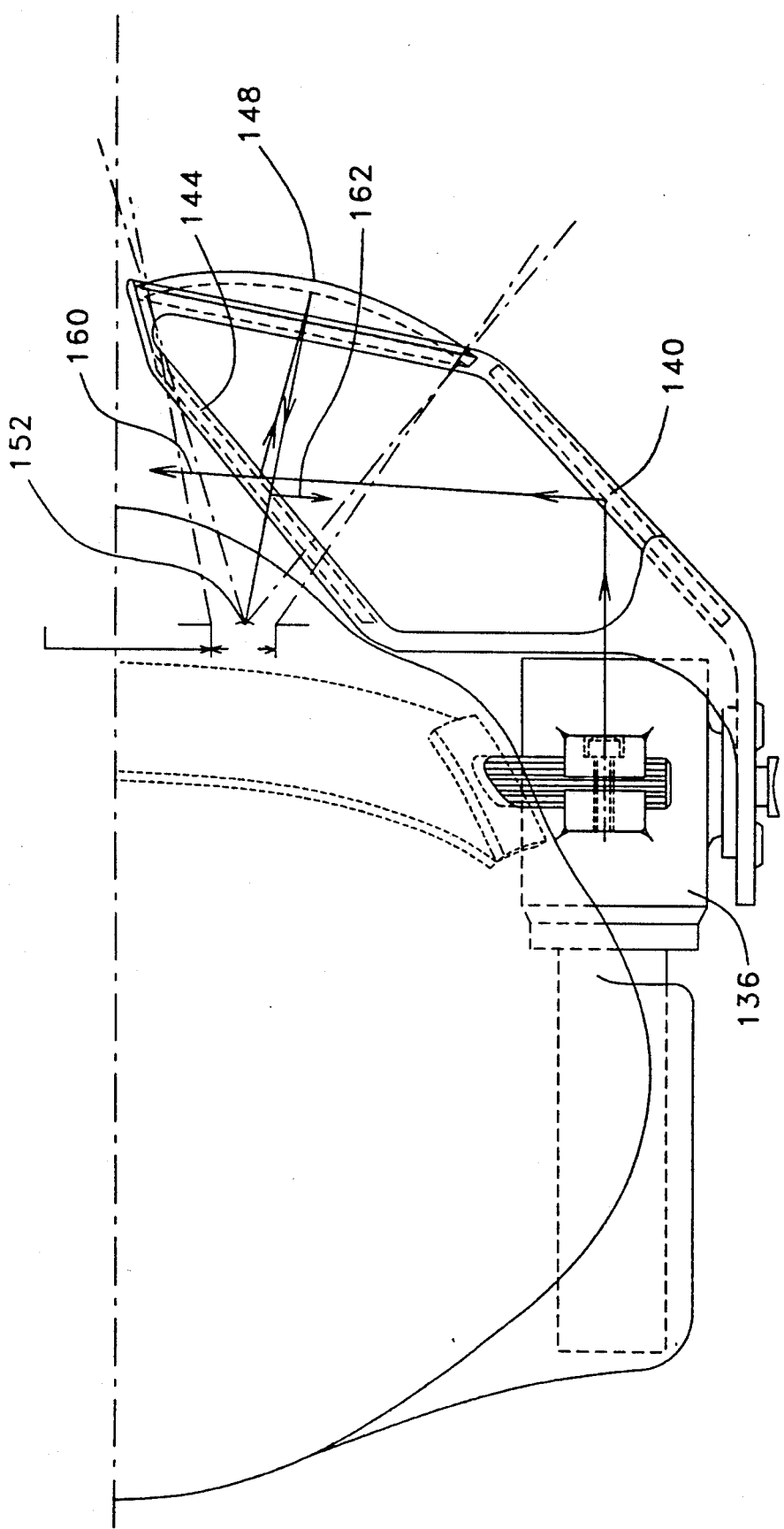
FIG. 7 is a partial top view of a helmet and display system of FIG. 5 illustrating the operation of the optics.

As may be seen in FIG. 7, trichromatic light emerging from relay lens package 136 strikes reflector 140 and is split by holographic beamsplitter 144. Half of the trichromatic light 160 is lost while the balance is reflected to spherical holographic mirror 148 and reflected back through holographic beamsplitter 144 to the pupil 152 of the system at which the pilot's eye is positioned. The light passing through the first encounter with holographic beamsplitter 144 is directed downwardly to avoid interference with the other eye. On the second pass through the beamsplitter, another one-half of the trichromatic light 162 is lost. Thus, twenty-five percent of the trichromatic light from the CRT is delivered to the pupil, less any loss in transmission through the optical elements.

Beamsplitter 144 and mirror 148 are transparent at the visible wavelengths except for the three bands, each of approximately 20 nanometers width and centered around the three colors of the trichromatic light output of the CRT. Thus, spherical holographic mirror 148 will allow passage of all light outside the three bandwidths to reach the pupil coming from outside the system while reflecting those wavelengths that would compete with the light provided by the CRT. As the visible range of light is from approximately 400 nanometers to 770 nanometers, the loss of 60 nanometers of this spectrum does not significantly color nor attenuate the outside world.

Figure 8:
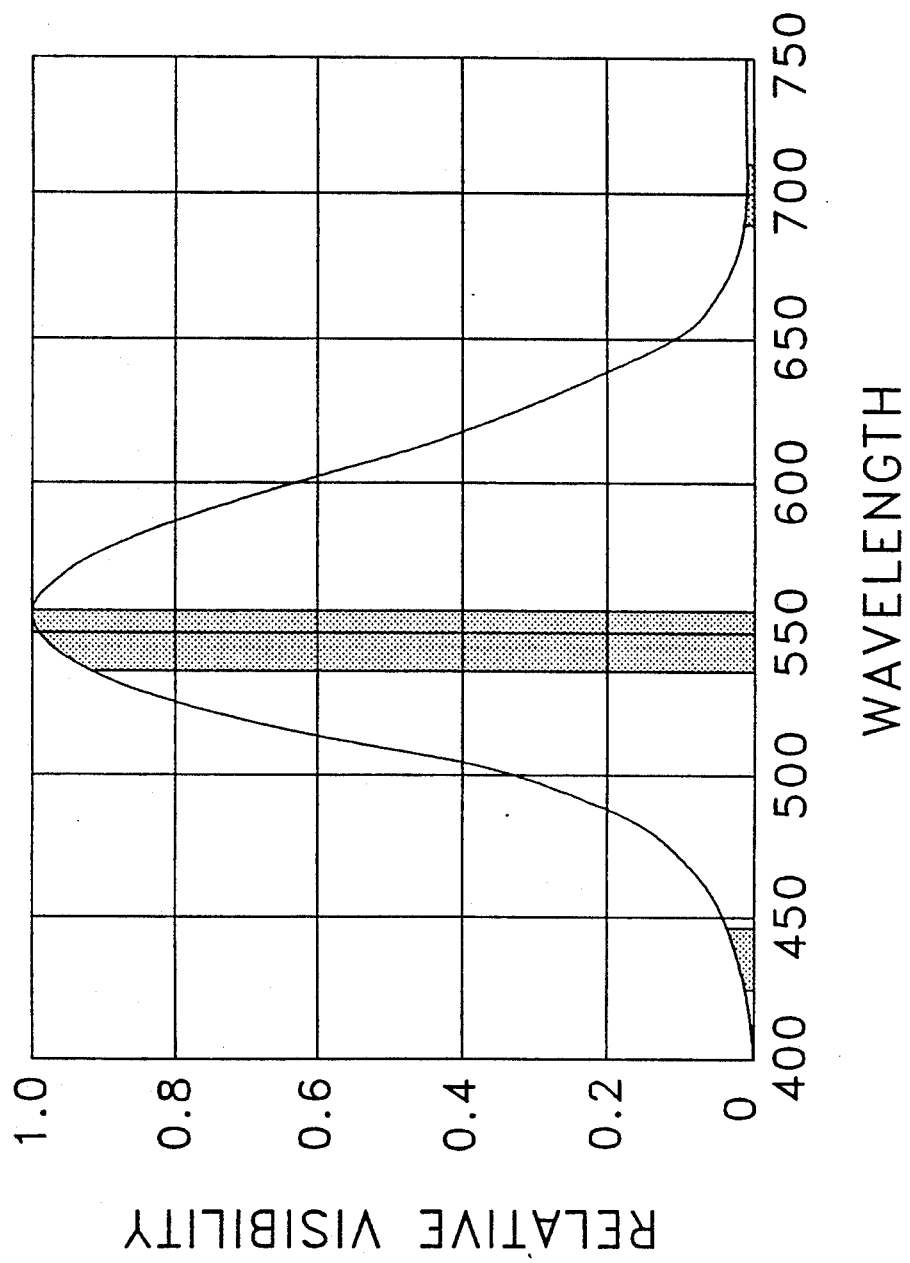
FIG. 8 is a graph showing the sensitivity for a normal eye over the visible spectrum.
Figure 9:
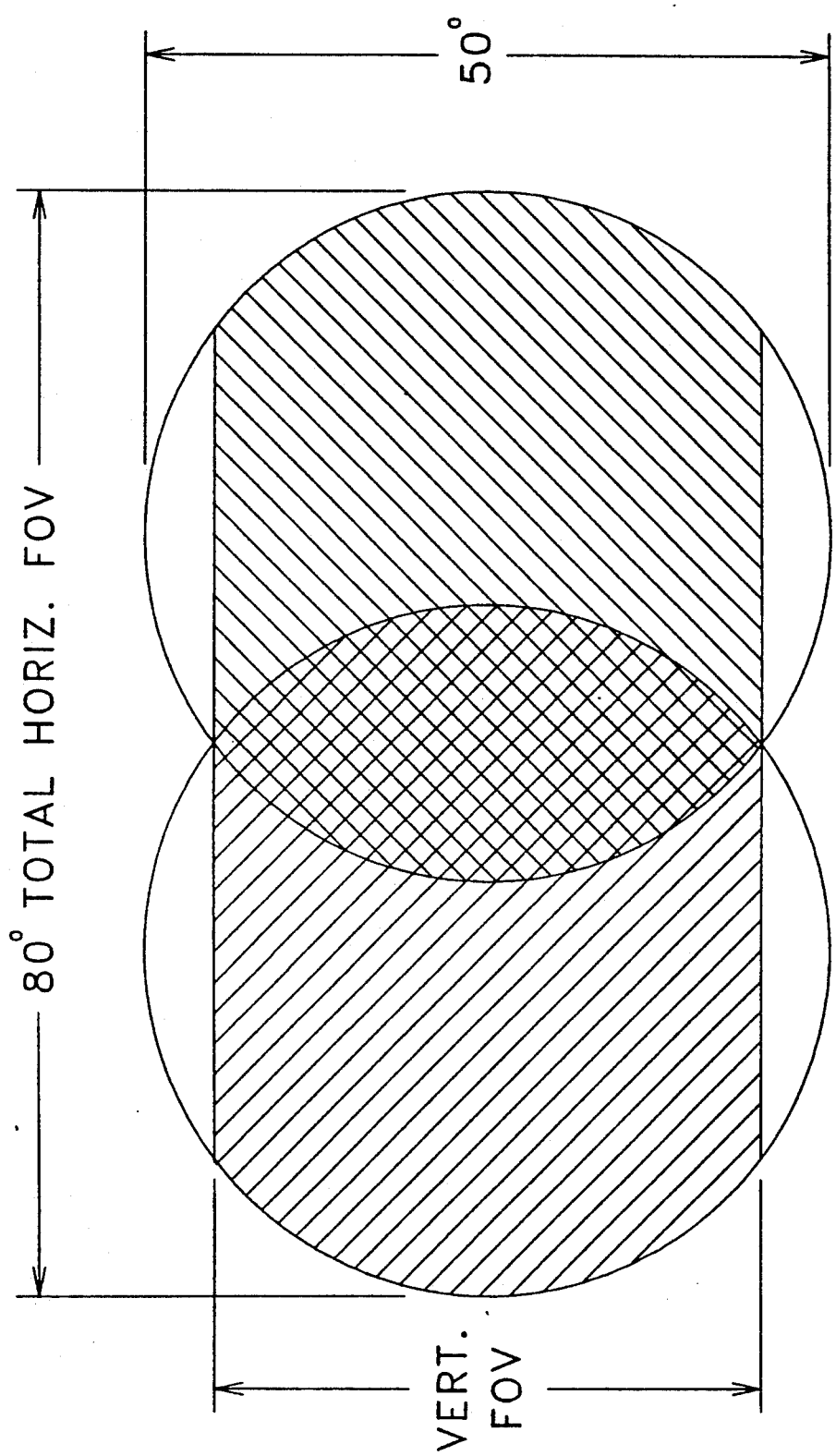
FIG. 9 is a schematic representation of the display span over the field of vision.

The human eye is not equally sensitive over the entire 370 nanometer visible range, hence the diminution of light is not simply a ratio of 60 to 370. FIG. 8 displays sensitivity of a normal eye at ordinary field brightness with respect to an arbitrary maximum of unity. Twenty nanometer bandwidths are blocked out for 700.0, 546.1 and 435.8 nanometers which correspond to chosen wavelengths in the tristimulus system of color specification. FIG. 9 depicts how two monacle assemblies interact with respect to the field of vision. Each monacle assembly covers a 50° field of vision and the two assemblies are arranged to overlap by 20° giving a continuity of vision while still maintaining a wide field of vision over an 80° field of vision. Smaller monacle assemblies each covering 40° field of vision may be used but the larger area offers better overlap and vision properties.

Figure 10:
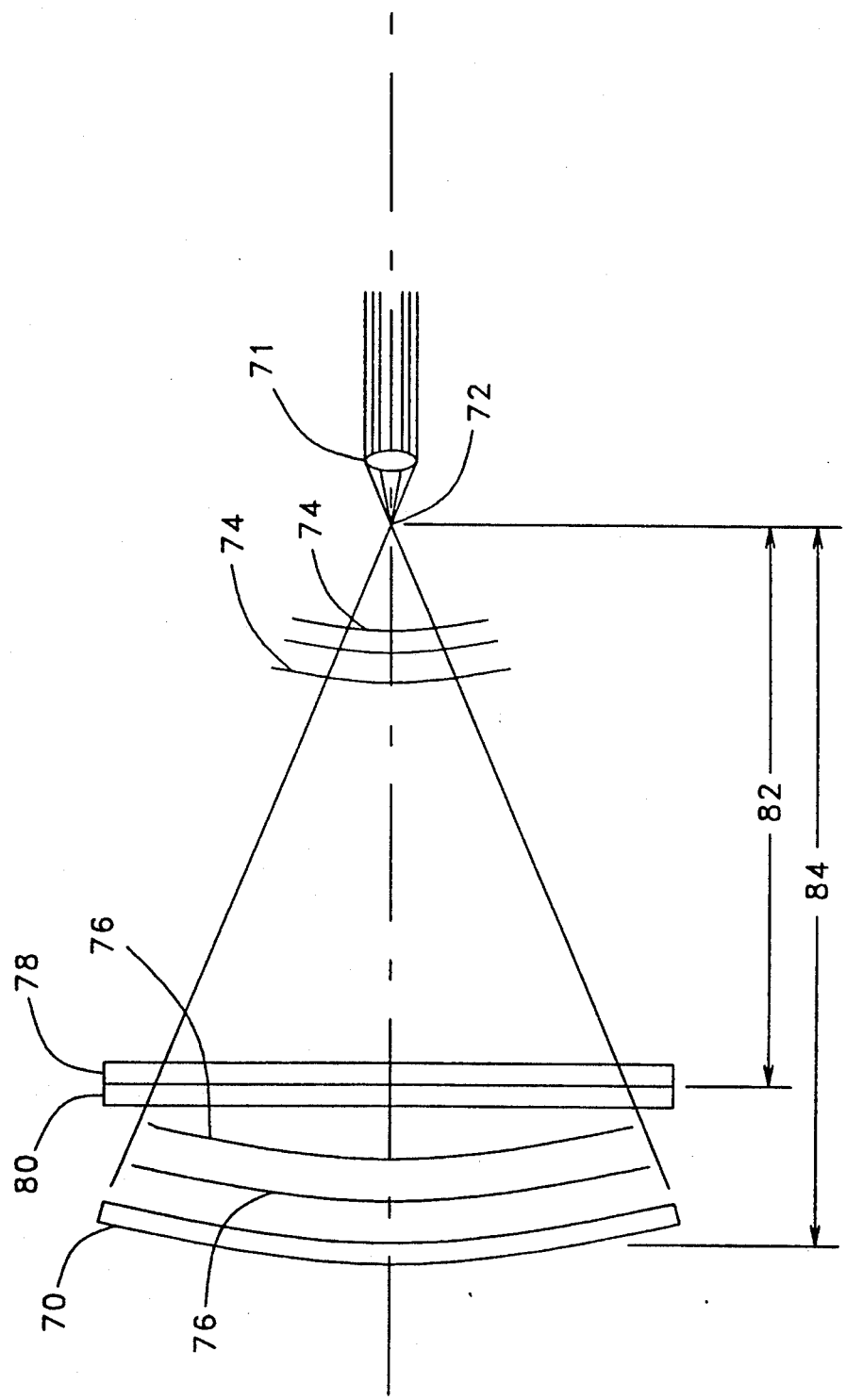
FIG. 10 illustrates the manufacture of a spherical mirror holographic element.

The wide field of vision is made possible by the holographic optical element used in the spherical mirrors. Referring to FIG. 10, holographic optical elements are formed using a spherical master mirror 70. A pencil of parallel laser light is focused with a lens 71 to form a point source at the focal point of the lens, which is positioned to put this point source at the center of the center of curvature 72 of spherical mirror 70. The point source generates spherical wavefronts, that strike mirror 70 and become reflected wavefronts 76. The reflected wavefront and the incoming wavefront interfere and the interference pattern is recorded on a dichromated gelatin layer 78 that is disposed on a planar glass substrate 80. It is noted that the resulting holographic optical element will have an effective radius of curvature 82 which is less than master mirror radius of curvature 84.

Such a holographic element may not offer ideal characteristics. The loss of efficiency narrows the usable angular dimensions of such a holographic optical element and prevents use of such a holographic optical element for a wide field of vision application. Moreover, because three individual holographic elements, generally a red, a green and a blue light element, must be combined to make a trichromatic holographic optical element with optical power, problems occur in obtaining exactly identical radii of curvature for each element at the different wavelengths. Each color light refracts differently as it passes through the focusing lens and the lens must be repositioned for exact focusing on the center of the radius of curvature. Additionally, each dichromated gelatin layer and substrate must be in the same position relative to the source and the spherical master mirror. If the radii of curvature do not correspond, spherical aberrations result. Moreover, all three holographic elements must be precisely centered to avoid color fringing.

Figure 11:
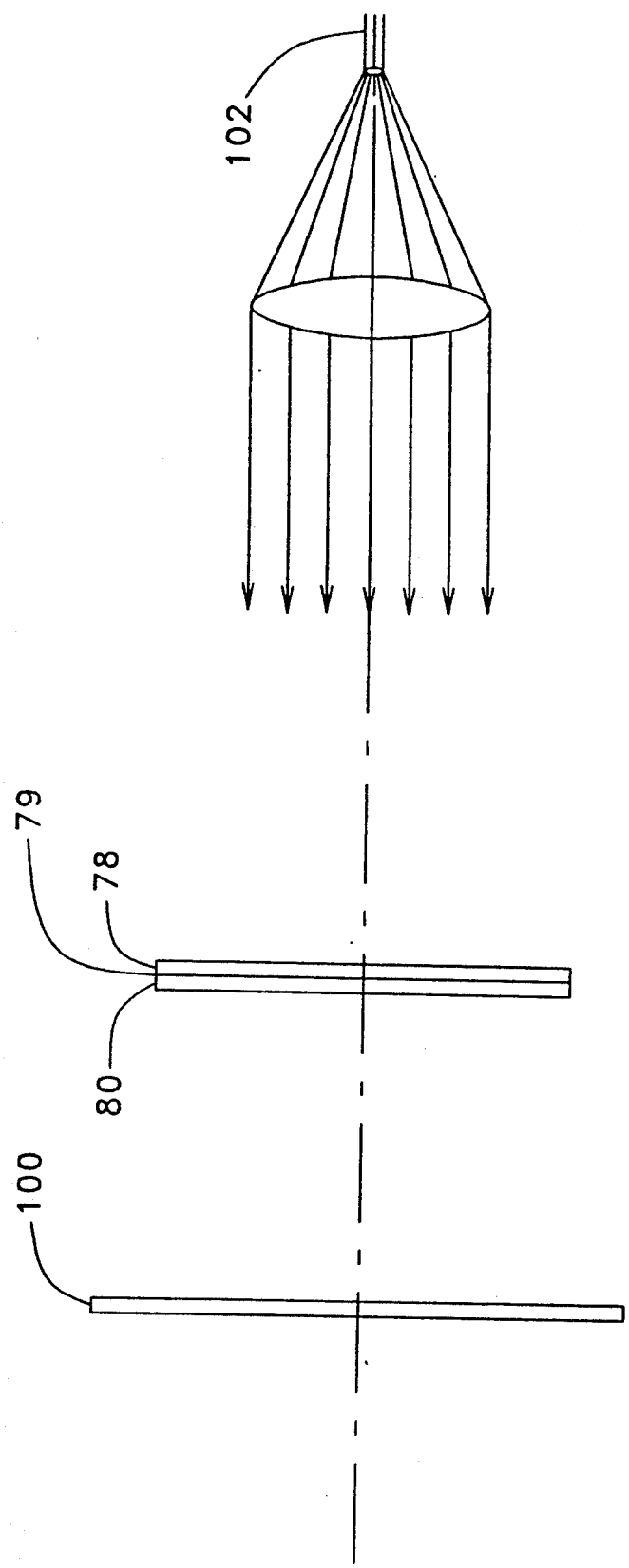
FIG. 11 schematically depicts the manufacture of a planar-mirror holographic element.
Figure 12:
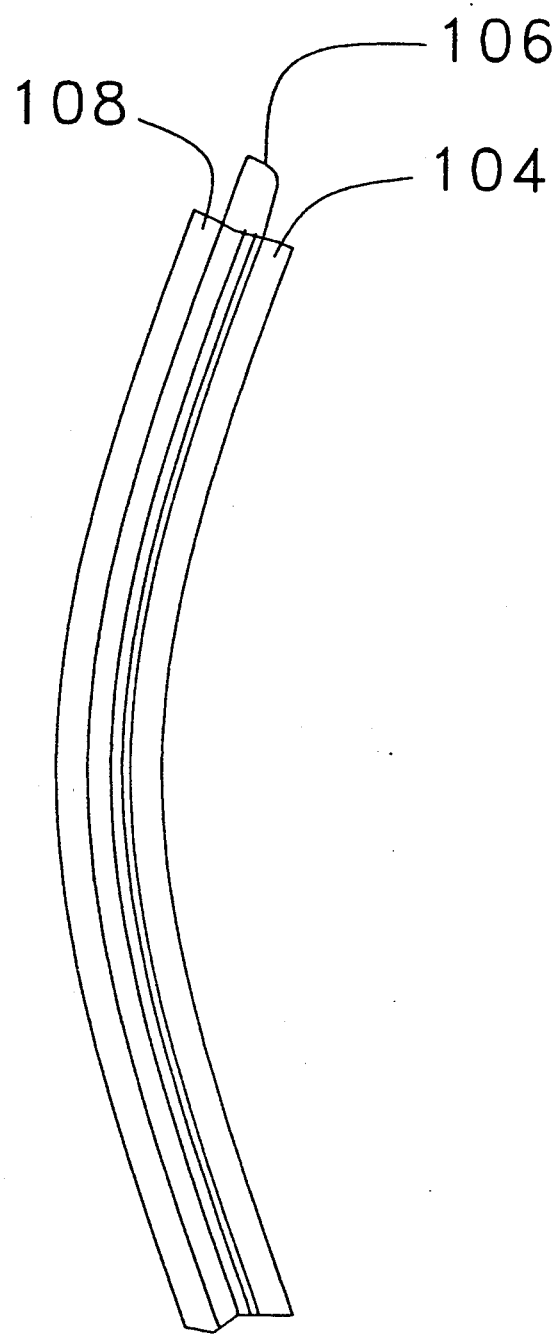
FIG. 12 schematically depicts a trichromatic holographic spherical mirror lens useful in the inventive system.

A preferred holographic element uses a planar master mirror 100 (FIG. 11) with monochromatic laser light to record the interference pattern on a dichromated gelatin layer 78 which is layered onto a thin plastic film 79 temporarily supported on a planar glass substrate 80. After recording and development of the hologram for one wavelength, successive layers of dichromated gelatin are coated and additional holograms are exposed and developed. A transparent substrate 104 (FIG. 12) of the desired optical power is chosen and planar holographic mirror elements 106 are adhered one by one, removing each thin plastic film after each adherence, and a protective transparent cover 108 is adhered over the elements 106.

Using three holographic elements formed under different color light, such as red, green and blue light, a trichromatic optical element is formed which assumes the optical power of the substrate.

As the optical substrate 104 determines the radius of curvature, it is the same for all three optical holographic elements thus avoiding spherical aberrations. Additionally, there are no optical centers of the holographic elements to align, obviating color fringing as a problem. Finally, with planar holographic reflector used, there is no Bragg angle difference in the holographic elements with respect to the normal to the surface of the substrate across all of the aperture. Accordingly, when the elements are adhered on a spherical substrate, efficiency is not lost as a function of distance from the center of the spherical substrate as there are no changes in the angle between the optical element surface and the focus and no internal Bragg angle differences.

The inventive holographic element is thus trichromatically active as a reflector and transparent to other wavelengths. This holographic element is comparatively easy to construct and avoids problems with spherical aberrations and color fringing and is useable for wide field of vision applications.

While an illustrative embodiment of the invention has been described above, it is, of course, understood that various modifications will be apparent to those of ordinary skill in the art. For example, all holographic elements can be designed to operate with only one wavelength or monochromatically. Also since trichromatic CRT's are not yet available in the small sizes shown, Fiber optic ropes can be used in their place to convey the images up to the relay lenses 34 and 36 from larger CRT's on a chest pack. Such modifications are within the spirit and scope of the invention, which is limited and defined only by the appended claims.

I claim:

1. A wide field of view reflective composite holographic imaging element possessing optical power, comprising:
   a) a curved optically transparent substrate having an outer reflection side curved to impart a desired optical power and having an inner side;
   b) a first holographic optical element reflective at a first wavelength, said first holographic element comprising a planar holographic mirror when said holographic optical element is formed into a planar configuration, said first holographic optical element being adhered at a first surface to said outer reflection surface and deformed to conform to said curved outer reflection side to have said desired optical power, said first holographic optical element having an outer surface opposite said first surface; and
   c) a second holographic optical element reflective at a second wavelength, said second wavelength being different from said first wavelength, said second holographic element comprising a planar holographic mirror when said second holographic optical element is formed into a planar configuration, said second holographic optical element being adhered to said outer surface of said first holographic optical element and deformed to conform to said curved outer surface to have said desired optical power, whereby the focal point and orientation of said deformed first and second holographic optical elements can focus images which are in registration with one another.

2. A wide field of view reflective composite holographic imaging element as claimed in claim 1, wherein said holographic optical elements are substantially monochromatic reflectors.

3. A wide field of view reflective composite holographic imaging element as claimed in claim 2, wherein each said holographic optical element is reflective over a bandwidth of approximately 20 nanometers.

4. A wide field of view reflective composite holographic imaging element as claimed in claim 2, wherein each said holographic optical element is optically transparent outside of the reflective bandwidth.

5. A wide field of view reflective composite holographic imaging element as claimed in claim 1, wherein said two holographic optical elements have different reflective bandwidths, said two holographic optical elements being enclosed between said curved substrate and a protective cover.

6. A helmet mounted, wide field of view, holographic display system comprising:
   a) a right trichromatic light source;
   b) a right target pupil to receive light from said right trichromatic light source;
   c) a right optical coupling between said right trichromatic light source and said right target pupil comprising:
      (i) a right planar beamsplitter positioned in front of said right target pupil and arranged at an oblique angle to a perpendicular to said right target pupil, light passing through said right beamsplitter passing downwardly and to the left away from said right target pupil and the remaining light being reflected thereby;
      (ii) a right mirror, optically coupling said right trichromatic light source with said right beamsplitter; and
      (iii) a right spherical holographic reflector receiving said remaining light and reflecting and focussing said remaining light back through said right planar beamsplitter to said right target pupil;
   d) a left trichromatic light source;
   e) a left target pupil to receive light from said left trichromatic light source;
   f) a left optical coupling between said left trichromatic light source and said left target pupil comprising:
      (i) a left planar beamsplitter positioned in front of said left target pupil and arranged at an oblique angle to a perpendicular to said left target pupil, light passing through said left beamsplitter passing downwardly and to the right away from said left target pupil and the remaining light being reflected thereby;
      (ii) a left mirror, optically coupling said left trichromatic light source with said left beamsplitter; and
      (iii) a left spherical holographic reflector receiving said remaining light and reflecting and focussing said remaining light back through said left planar beamsplitter to said left target pupil;
   g) a right framework supporting said right trichromatic light source and said right optical coupling;
   h) a left framework supporting said left trichromatic light source and said left optical coupling; and
   i) a helmet;
said right framework support mounted on said helmet; and said left framework support mounted on said helmet, said left spherical holographic reflector and said right spherical holographic reflector each comprising an optically transparent substrate of a desired optical power, three monochromatic holographic mirror elements adhered to said substrate and taking the power of said substrate, each of said three monochromatic holographic mirror elements corresponding to a different one of the three wavelengths of the trichromatic light from the trichromatic light sources, and an optically transparent protective cover enclosing said three monochromatic holographic mirror elements between said substrate of desired optical power and said protective cover.

7. A helmet mounted display system as claimed in claim 6, wherein said left optical coupling and said right optical coupling further comprise a left relay lens package and a right relay lens package, respectively, the relay lens packages being positioned optically between their respective trichromatic light sources and the mirrors and supported by the frameworks.

8. A helmet mounted display system as claimed in claim 7, wherein said left optical coupling and said right optical coupling further comprise a left prism and a right prism, respectively, the prisms being positioned optically between their respective trichromatic light sources and the relay lens packages.

9. A helmet mounted display system as claimed in claim 6 wherein said left spherical holographic reflector and said right spherical holographic reflector are configured, dimensioned and positioned with respect to said left target pupil and said right target pupil, respectively, to each span at least a forty degree field of vision with respect to each target pupil.

10. A helmet mounted display system as claimed in claim 9, wherein said left spherical holographic reflector and said right spherical holographic reflector are configured, dimensioned and positioned with respect to said left target pupil and said right target pupil, respectively, to each span at least a fifty degree field of vision with respect to each target pupil.

11. A helmet mounted display system as claimed in claim 10, wherein said left spherical holographic reflector and said right spherical holographic reflector are configured, dimensioned and positioned with respect to said left target pupil and said right target pupil, respectively, and to each other to combine to span an 80 degree horizontal field of view with respect to the two target pupils taken together.

12. A helmet mounted display system as claimed in claim 6, wherein said left framework support and said right framework support each comprise two splined rods to accommodate adjustment of said display system and to rigidly maintain an adjustment when in use.

* * * * *